(12) United States Patent
Donovan et al.

(10) Patent No.: US 10,800,706 B2
(45) Date of Patent: Oct. 13, 2020

(54) VESICLE DEDUSTING AGENTS FOR JOINT COMPOUNDS

(71) Applicant: UNITED STATES GYPSUM COMPANY, Chicago, IL (US)

(72) Inventors: Alexander J. Donovan, Lake Forest, IL (US); Salvatore C. Immordino, Trevor, WI (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 16 days.

(21) Appl. No.: 16/365,966

(22) Filed: Mar. 27, 2019

(65) Prior Publication Data

US 2019/0322585 A1 Oct. 24, 2019

Related U.S. Application Data

(60) Provisional application No. 62/661,264, filed on Apr. 23, 2018.

(51) Int. Cl.
| | | |
|---|---|---|
| *C04B 28/14* | (2006.01) | |
| *C04B 24/38* | (2006.01) | |
| *C04B 26/04* | (2006.01) | |
| *C04B 14/28* | (2006.01) | |
| *C04B 14/04* | (2006.01) | |
| *C04B 16/12* | (2006.01) | |
| *C04B 103/44* | (2006.01) | |
| *C04B 111/00* | (2006.01) | |
| *C04B 103/00* | (2006.01) | |
| *C04B 103/22* | (2006.01) | |

(52) U.S. Cl.
CPC ............ *C04B 28/14* (2013.01); *C04B 14/042* (2013.01); *C04B 14/28* (2013.01); *C04B 16/12* (2013.01); *C04B 24/383* (2013.01); *C04B 26/04* (2013.01); *C04B 2103/0075* (2013.01); *C04B 2103/22* (2013.01); *C04B 2103/44* (2013.01); *C04B 2111/00681* (2013.01); *C04B 2111/00689* (2013.01)

(58) Field of Classification Search
CPC ....... C04B 14/042; C04B 14/28; C04B 16/12; C04B 24/383; C04B 26/04; C04B 28/14; C04B 2103/44; C04B 2103/22; C04B 2103/0075; C04B 2111/00681; C04B 2111/00689
See application file for complete search history.

(56) References Cited

U.S. PATENT DOCUMENTS

| | | | |
|---|---|---|---|
| 4,454,267 | A | 6/1984 | Williams |
| 4,525,388 | A | 6/1985 | Rehder et al. |
| 5,746,822 | A | 5/1998 | Espinoza et al. |
| 5,779,786 | A | 7/1998 | Patel |
| 6,358,309 | B1 | 3/2002 | Langford |
| 6,673,144 | B2 | 1/2004 | Immordino, Jr. et al. |
| 6,676,746 | B2 | 1/2004 | Langford |
| 6,733,581 | B2 | 5/2004 | Langford |
| 6,805,741 | B1 | 10/2004 | Liu et al. |
| 6,863,723 | B2 | 3/2005 | Langford |
| 7,045,008 | B2 | 5/2006 | Langford |
| 7,048,791 | B2 | 5/2006 | Langford |
| 7,052,544 | B2 | 5/2006 | Langford |
| 7,407,996 | B2 | 8/2008 | Langford |
| 7,449,060 | B2 | 11/2008 | Langford |
| 8,329,785 | B2 | 12/2012 | Langford |
| 8,673,071 | B2 | 3/2014 | Immordino, Jr. et al. |
| 8,969,472 | B2 | 3/2015 | Stewart et al. |
| 9,115,027 | B2 | 8/2015 | Ayambem et al. |
| 9,388,079 | B2 | 7/2016 | Langford |
| 9,828,504 | B2 | 11/2017 | Ayambem et al. |
| 2007/0246683 | A1 | 10/2007 | Miller et al. |
| 2008/0141909 | A1 | 6/2008 | Immordino et al. |
| 2015/0158999 | A1 | 6/2015 | Ayambem et al. |
| 2016/0032583 | A1 | 2/2016 | Xu et al. |
| 2016/0090451 | A1 | 3/2016 | Ayambem |
| 2016/0123009 | A1 | 5/2016 | Ayambem |
| 2016/0168439 | A1 | 6/2016 | Ayambem |
| 2016/0376798 | A1 | 12/2016 | Ayambem |
| 2017/0081245 | A1 | 3/2017 | Margheritis et al. |
| 2017/0088751 | A1 | 3/2017 | Ayambem |
| 2017/0233293 | A1 | 8/2017 | Ayambem |
| 2017/0275479 | A1 | 9/2017 | Ayambem |
| 2017/0362482 | A1 | 12/2017 | Ayambem et al. |
| 2019/0322583 | A1* | 10/2019 | Donovan ............... C04B 26/04 |
| 2019/0375681 | A1* | 12/2019 | Donovan ............... B05D 3/12 |

* cited by examiner

*Primary Examiner* — Anthony J Green
(74) *Attorney, Agent, or Firm* — Vorys, Sater Seymour and Pease LLP; Pradip Sahu; Philip T. Petti

(57) ABSTRACT

A drying-type joint compound can comprise: (a) a primary filler at about 50 weight percent (wt %) to about 98 wt % on a dry basis, wherein the primary filler includes one member selected from the group of calcium carbonate, calcium sulfate dihydrate, and talc, and a mixture thereof; (b) a secondary filler at up to about 25 wt % on a dry basis; (c) a binder at about 1 wt % to about 15 wt % on a dry basis; (d) a polymer thickener at about 0.05 wt % to about 3 wt % on a dry basis; (e) a vesicle dedusting agent at about 0.01 wt % to about 10 wt % on a dry basis, wherein the vesicle dedusting agent comprises vesicles; and (f) an additive up to about 10 wt % o on a dry basis; and (g) water at a ratio of water to dry components of about 1:6 to about 3:1.

14 Claims, 2 Drawing Sheets

VESICLE DEDUSTING AGENTS FOR JOINT COMPOUNDS

FIELD OF THE INVENTION

This invention relates generally to joint compounds comprising novel vesicle dedusting agents.

BACKGROUND OF THE INVENTION

In the construction of buildings, one of the most common building elements is gypsum wallboard, often known as drywall or gypsum paneling, used in the construction of walls and/or ceilings. The board may be composed of any of a variety of materials, including but not limited to, cementitious materials such as, for example, cement or gypsum. Walls made from gypsum wallboard are traditionally constructed by affixing the panels to wood studs or metal framing, and treating the joints between adjoining panels with a specially prepared adhesive called a joint compound. Gypsum panels easily accommodate walls that are unusual in size and can be shaped around structural elements such as beams or pipes. The side edges of the drywall panels are tapered, thus allowing the joint compound to be applied to the seam, between adjoining panels, in such a way that a monolithic surface is created when finished. It is well known in the art that finishing a joint between boards involves three steps. First, a thin layer of joint compound is applied to the boards over the joint, and a liquid-permeable paper or fiberglass tape is embedded into it. Next, a second coat of joint compound is applied over the embedded joint tape. The second coat of joint compound typically extends approximately two inches beyond the edges of the joint tape. Finally, a third coat of joint compound is applied over the first two coats, where the third coat typically extends even further out from the edges of the joint tape. Both the second and third coat may be subsequently lightly sanded upon drying. Joint compounds are also used to make repairs of defects, such as uneven surfaces, holes, depressions, gaps, dents, and other imperfections including those around electrical boxes, piping and duct work, as well as corners created by the intersection of drywall boards.

There are several categories of joint compounds. Drying type compounds cure through the evaporation of water, whereas setting type joint compounds chemically react with water during the curing process. Setting type joint compounds typically use calcium sulfate hemihydrate, also known as stucco or Plaster of Paris, as a base. When water is added to the setting type powder, it reacts with the calcium sulfate hemihydrate via a hydration reaction to form an interlocking matrix of calcium sulfate dihydrate crystals. The interlocking crystal matrix gives the compound increased strength. The benefit of a setting type joint compound over a drying type is an independence from having to wait for the joint compound to be completely dry prior to further finishing, as well as less shrinkage and cracking, and a higher overall strength of the finished joint. Drying type joint compounds have the advantage of ease of use, as they typically come in a ready mixed form, with water being added and mixed by the manufacturer. A third type of joint compound combines the setting action of a calcium sulfate hemihydrate based compound with the ease of use of a ready mixed compound. The properties of a ready mixed setting type joint compound are taught in U.S. Pat. No. 5,746,822, incorporated herein by reference.

Between coats of joint compound, and before the wall is decorated, it is necessary to sand the joint compound to even the surface. While doing so, the dust generated is generally very fine and tends to remain airborne, settling out only after long periods of time. This long residence time in the air allows it to travel long distances from the site of the wall. In a home repair, this fine dust is not confined to the area immediately adjacent to where the joint compound is being used, but is often found throughout the house, resulting in fine dust settling everywhere.

Liquid mineral oils and solid waxes (for example polyethylene glycol wax) are known to reduce dust in gypsum-based compositions and are often incorporated with the joint compounds as a dedusting agent. A dedusting agent is defined as a material with the ability to reduce the production of airborne dust generated upon sanding or other disturbance and/or with the ability to reduce the airborne residence time of the dust generated compared to a similar material without the dedusting additive. Examples of mineral oil and solid wax dedusting agents are described in U.S. Pat. No. 6,673,144 of Immordino, Jr. et al. and U.S. Pat. No. 6,676,746 of Langford.

However, these dedusting agents have a number of drawbacks. For example, liquid mineral oils and waxes are substantially as individually dispersed, free molecules in the joint composition. When drying, thermodynamics and their wetting physical properties causes these molecules to migrate toward the surface of the gypsum product, which results in an uneven distribution of dust reducing properties. Further, when at the surface, mineral oils and liquid waxes also cause the loss of adhesion to the substrate at higher concentrations. Additionally, when some water-soluble, synthetic waxes are added to the slurry water with other solid components, the solid synthetic waxes tend to float on the surface for a long time, dissolving slowly after prolonged mixing.

Alternative dedusting agents that include wax emulsions and polymer coated wax core particulates have been developed, for example, as described in U.S. Patent No. 2015/0158999 Ayambem et al. and U.S. Patent Application Publication No. 2016/0376798 of Ayambem. In this example, the emulsion or polymer coating allow a solid, hydrophobic core material to be dispersed in water.

SUMMARY OF THE INVENTION

This invention relates generally to joint compounds comprising novel vesicle dedusting agents.

For example, a drying-type joint compound can comprise:
(a) a primary filler at about 50 weight percent (wt %) to about 98 wt % of the drying-type joint compound on a dry basis, wherein the primary filler comprises one selected from the group consisting of calcium carbonate, calcium sulfate dihydrate, and talc, and a mixture thereof;
(b) a secondary filler at up to about 25 wt % of the drying-type joint compound on a dry basis;
(c) a binder at about 1 wt % to about 15 wt % of the drying-type joint compound on a dry basis;
(d) a polymer thickener at about 0.05 wt % to about 3 wt % of the drying-type joint compound on a dry basis;
(e) a vesicle dedusting agent at about 0.01 wt % to about 10 wt % of the drying-type joint compound on a dry basis, wherein the vesicle dedusting agent comprises vesicles; and
(f) an additive up to about 10 wt % of the drying-type joint compound on a dry basis; and
(g) water at a ratio of water to dry components of about 1:6 to about 3:1.

In another example, a setting-type joint compound can comprise:
(a) a calcium sulfate hemihydrate at about 20 weight percent (wt %) to about 99 wt % of the setting-type joint compound on a dry basis;
(b) a filler at up to about 30 wt % of the setting-type joint compound on a dry basis;
(c) a binder at about 0.5 wt % to about 8 wt % of the setting-type joint compound on a dry basis;

(d) a polymer thickener at about 0.05 wt % to about 2 wt % of the setting-type joint compound on a dry basis;
(e) a vesicle dedusting agent at about 0.01 wt % to about 10 wt % of the setting-type joint compound on a dry basis, wherein the vesicle dedusting agent comprises vesicles; and
(f) an additive up to about 10 wt % of the setting-type joint compound on a dry basis.

In yet another example, a ready-mixed setting-type joint compound can comprise:
(a) a calcium sulfate hemihydrate at about 20 weight percent (wt %) to about 99 wt % of the ready-mixed, setting-type joint compound on a dry basis;
(b) a filler at up to about 30 wt % of the ready-mixed, setting-type joint compound on a dry basis;
(c) a set retarder at about 0.001 wt % to about 2 wt % of the ready-mixed, setting-type joint compound on a dry basis
(d) a binder at up to about 8 wt % of the ready-mixed, setting-type joint compound on a dry basis;
(e) a polymer thickener at up to about 2 wt % of the ready-mixed, setting-type joint compound on a dry basis;
(f) a vesicle dedusting agent at about 0.01 wt % to about 10 wt % of the ready-mixed, setting-type joint compound on a dry basis, wherein the vesicle dedusting agent comprises vesicles;
(g) an additive up to about 10 wt % of the ready-mixed, setting-type joint compound on a dry basis; and
(h) water at a ratio of water to dry components of about 1:6 to about 3:1.

Other advantages, benefits and aspects of the invention are discussed below, are illustrated in the accompanying figures, and will be understood by those of skill in the art from the more detailed disclosure below. All percentages, ratios and proportions herein are by weight, unless otherwise specified.

As used in the present specification at the very least, and not as an attempt to limit the application of the doctrine of equivalents to the scope of the claim, each numerical parameter modified by the term "about" should at least be construed in light of the number of reported significant digits and by applying ordinary rounding techniques.

DETAILED DESCRIPTION OF THE INVENTION

All percentages and ratios used herein, unless otherwise specified, are by weight (i.e., wt %) unless otherwise indicated.

Vesicles comprise fluid enclosed by a lipid bilayer.

The present invention provides joint compounds comprising vesicle dedusting agent that comprises vesicles. The vesicles may be liposomes or polymersomes, which are supramolecular structures formed by assembling lipids and/or polymers into the bilayer walls of the vesicle.

Figure 1:
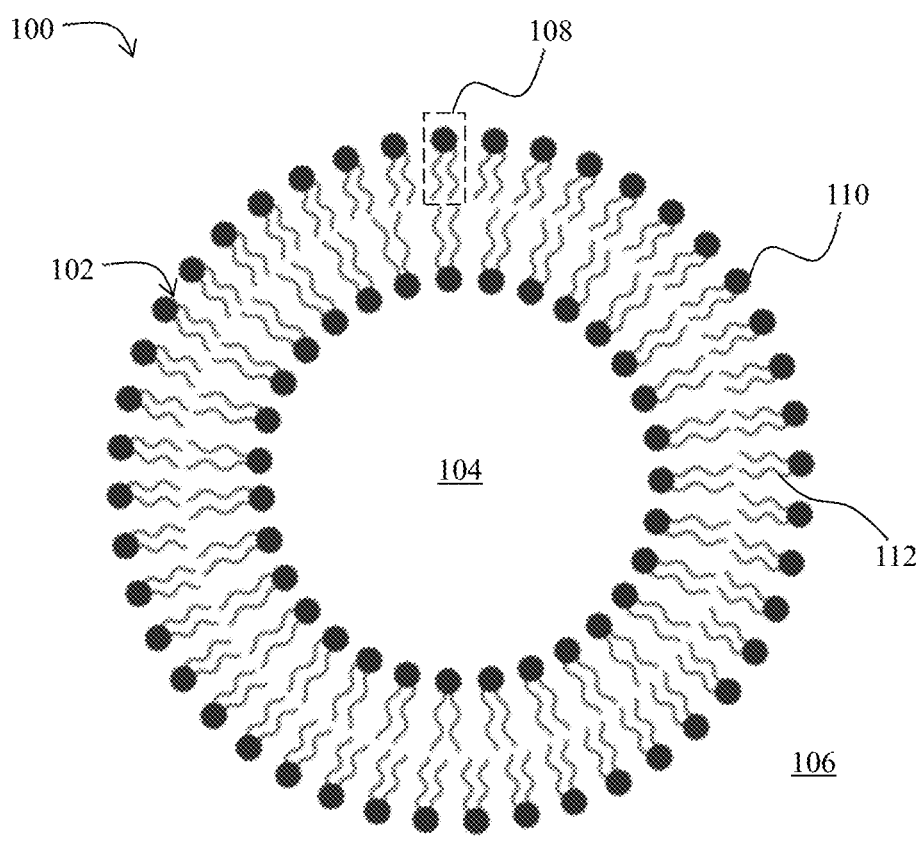
FIG. 1 illustrates a representation of a unilamellar vesicle.

FIG. 1 illustrates a representation a unilamellar vesicle 100 (i.e., a vesicle having one wall 102) with an aqueous fluid 104 inside the vesicle 100 and an aqueous fluid 106 outside the vesicle 100. The wall 102 comprises amphiphilic compounds 108 having a hydrophilic head group 110 and a hydrophobic tail group 112. The vesicles in the vesicle dedusting agent described herein preferably comprise unilamellar vesicles with an average hydrodynamic diameter of about 50 nm to about 500 nm and/or multilamellar vesicles with an average hydrodynamic diameter of about 100 nm to about 25 microns.

In contrast, other joint compounds, including those described above, use dedusting agents like amphiphilic compounds in their free form.

Figure 2:
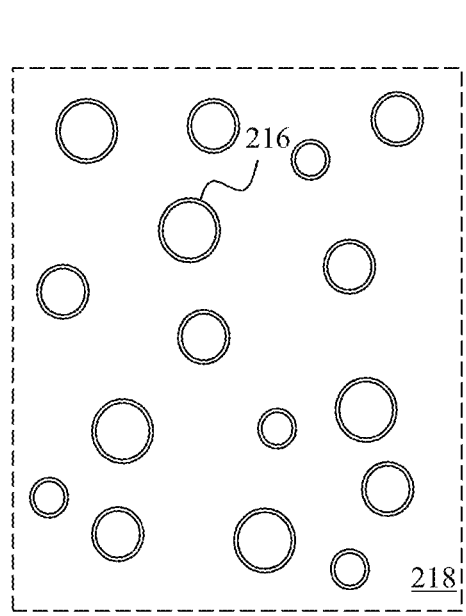
FIG. 2 illustrates a representation of an aqueous slurry that has dispersed therein the vesicle dedusting agent that comprises vesicles, which can be used for making a joint compound of the present invention.

FIG. 2 illustrates a representation of an aqueous slurry 218 that has dispersed therein the vesicle dedusting agent that comprises vesicles 216, which can be used for making a joint compound of the present invention.

Figure 3:
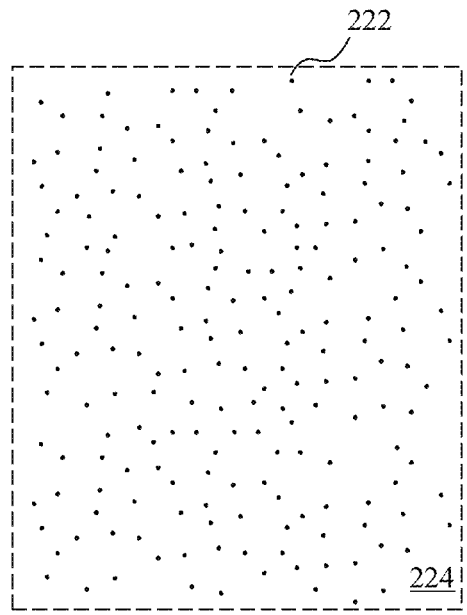
FIG. 3 illustrates a representation of an aqueous slurry that has dispersed therein a dedusting agent that comprises free polymers, which can be used for making a traditional joint compound.

FIG. 3, in contrast, illustrates a representation of an aqueous slurry 224 that has dispersed therein a dedusting agent that comprises free polymers 222, which can be used for making a traditional joint compound.

FIGS. 2 and 3 are to similar scales and represent the different joint compounds before drying and/or setting.

In the free form, compounds like lecithin migrate to the surface of the slurry during drying because of the compound's amphiphilic properties. Therefore, the bulk of the dedusting agent based on free form slurry dispersions (FIG. 3) is at or near the surface of the dried joint compound, which results in higher dusting as the joint compound is sanded to greater depths.

Vesicles, on the other hand, form a bilayer structure with hydrophilic head groups on the vesicle exterior. Therefore, the thermodynamic driving force for surface migration is greatly reduced with vesicles compared to free compounds. As such, the vesicles will be more homogeneously dispersed through the dried joint compound, which results in more effective dedusting as the joint compound is sanded to greater depths.

In either instance (free or vesicle), the main driver for the dedusting effect is the phase change of the compounds like lecithin from fluid to solid. Sanding induces the phase change to the fluid state so the compounds agglomerate the dust particulates. Therefore, it is believed that the amphiphilic compound (e.g., lecithin) will substantially maintain its overall dedusting efficacy in the vesicle structure while benefitting from reduced migration.

Finally, regarding known wax emulsions and polymer coated wax core particulates, these dedusting agents are hydrophobic particulates with a coating (polymer or emulsifier) that allows for better dispersion in water. In contrast, the vesicles in the vesicle dedusting agents of the present invention have an aqueous core (see FIG. 1) and the molecules and compounds that compose the wall of the vesicle reduce dusting.

Joint Compounds

The present invention is directed, at least in part, to joint compounds with less dusting properties. More specifically, the joint compounds comprise a vesicle dedusting agent.

A variety of joint compounds have been sold commercially, as well as described in printed publications and patents. Generally, such compound compositions are referred to as either "drying-type" joint compounds or "setting-type" joint compounds and are made up of a filler (e.g., calcium carbonate, calcium sulfate hemihydrate, or calcium sulfate dihydrate), thickener, preservative, and a binder, as well as various other additives like a dedusting agent. The vesicle dedusting agent of the present invention are suitable for either type of joint compounds.

Drying-type joint compositions are pre-mixed with water during manufacturing and require little or no addition of water at the job site. Drying-type joint compositions can also be dry powders that are mixed with water at the job site. Drying-type joint compounds harden when the water evaporates and the compound dries. Drying-type joint compounds substantially contain a filler component. Prior to use (generally during manufacturing), the filler, a binder, a thickener, a dedusting agent, and optionally several other ingredients are mixed for a specific time with water to produce the drying-type joint compound. Such a composition has a high ionic content and basic pH. Once the drying-type joint compound is applied to the wallboard panels, the composition dries (i.e., water evaporates) and a dry, relatively hard cementitious material remains.

TABLE 1 provides examples of drying-type joint compound formulations of the present invention where the water is present in the mixture for a ready mixed, drying-type joint or the water is later mixed with the other components in the prescribed amounts. In TABLE 1 a range for a parameter in any column may be combined with the ranges for the other parameters from any other column. However, preferably all the ranges in a column are used together.

TABLE 1

Drying-type (DT) joint compound formulations

| Component | Useable range | Preferred range | Most Preferred Range | Specific example |
|---|---|---|---|---|
| Primary DT Filler (wt % on a dry basis) | 50 to 98 | 50 to 93 | 65 to 93*<br>50 to 93** | 65 to 93*<br>55 to 75** |
| Secondary DT Filler (wt % on a dry basis) | up to 25 | up to 25 | 3 to 25 | 4 to 25 |
| Binder (wt % on a dry basis) | 1 to 15 | 1 to 10 | 1 to 10 | 1 to 8 |
| Polymer Thickener (wt % on a dry basis) | 0.05 to 3 | 0.1 to 3 | 0.1 to 2 | 0.5 to 2 |
| Vesicle Dedusting Agent (wt % on a dry basis) | 0.01 to 10 | 0.1 to 5 | 0.1 to 3 | 0.3 to 0.8*** |
| Other Additives (wt % on a dry basis) | up to 10 | 0.01 to 10 | 0.01 to 10 | 0.1 to 10 |
| Water (weight ratio of water to dry components) | 1:6 to 3:1 | 1:4 to 2:1 | 1:3 to 1:1 | 1:2 |

*calcium carbonate
**calcium sulfate dihydrate
***ultra-sonicated lecithin vesicles A setting-type joint compound generally includes calcium sulfate hemihydrate ($CaSO_4 \cdot H_2O$; also referred to as calcined gypsum). Upon being mixed with water, the calcium sulfate hemihydrate is hydrated, which causes dihydrate crystals to form and interlock. Once completed, a dry, relatively hard cementitious material remains. The rehydration of calcium sulfate hemihydrate normally takes place over a fairly short period of time. Therefore, setting-type compound compositions are typically supplied to the job site in the form of a dry powder to which the user then adds a sufficient amount of water to give the compound a suitable consistency to be applied to the wall.

TABLE 2 provides examples of the dry powder of setting-type joint compound formulations of the present invention. Water can be added to the dry powder before use at a weight ratio of water to dry components of about 1:6 to about 3:1, preferably about 1:4 to about 2:1, more preferably about 1:3 to about 1:1, and most preferably about 1:2. In TABLE 2 a range for a parameter in any column may be combined with the ranges for the other parameters from any other column. However, preferably all the ranges in a column are used together.

TABLE 2

Setting-type (ST) joint compound formulations

| Component | Useable range | Preferred range | Most Preferred Range | Specific example |
|---|---|---|---|---|
| Calcium Sulfate Hemihydrate (wt % on a dry basis) | 20 to 99 | 50 to 98 | 60 to 85 | 65 to 85 |
| ST Filler (wt % on a dry basis) | up to 30 | up to 30 | 5 to 30 | 5 to 25 |
| Binder (wt % on a dry basis) | 0.5 to 8 | 1 to 8 | 1 to 4 | 1 to 4 |
| Polymer Thickener (wt % on a dry basis) | 0.05 to 2 | 0.1 to 2 | 0.1 to 1 | 0.1 to 1 |

TABLE 2-continued

Setting-type (ST) joint compound formulations

| Component | Useable range | Preferred range | Most Preferred Range | Specific example |
|---|---|---|---|---|
| Vesicle Dedusting Agent (wt % on a dry basis) | 0.01 to 10 | 0.1 to 5 | 0.1 to 3 | 0.3 to 0.8* |
| Other Additives (wt % on a dry basis) | up to 10 | 0.01 to 5 | 0.1 to 5 | 0.1 to 5 |

*ultra-sonicated lecithin vesicles

A ready-mixed, setting-type joint compound is an aqueous slurry setting-type joint compound that contains a sufficient concentration of set retarder to prevent setting before use. When ready to use, an accelerator is added in an amount to achieve a desired set time.

TABLE 3 provides examples of the ready-mixed, setting-type joint compound formulations of the present invention. In TABLE 3 a range for a parameter in any column may be combined with the ranges for the other parameters from any other column. However, preferably all the ranges in a column are used together.

TABLE 3

Ready-mixed, setting-type joint compound formulations

| Component | Useable range | Preferred range | Most Preferred Range | Specific example |
|---|---|---|---|---|
| Calcium Sulfate Hemihydrate (wt % on a dry basis) | 20 to 99 | 50 to 98 | 60 to 85 | 65 to 85 |
| ST Filler (wt % on a dry basis) | up to 30 | up to 30 | 5 to 30 | 5 to 25 |
| Set Retarder (wt % on a dry basis) | 0.001 to 2 | 0.01 to 2 | 0.1 to 1 | 0.25 to 0.75 |
| Binder (wt % on a dry basis) | up to 8 | up to 6 | up to 4 | 1 to 4 |
| Polymer Thickener (wt % on a dry basis) | up to 2 | up to 2 | 0.1 to 1 | 0.1 to 1 |
| Vesicle Dedusting Agent (wt % on a dry basis) | 0.01 to 10 | 0.1 to 5 | 0.1 to 3 | 0.3 to 0.8* |
| Other Additives (wt % on a dry basis) | up to 10 | 0.01 to 5 | 0.1 to 5 | 0.1 to 5 |
| Water (weight ratio of water to dry components) | 1:6 to 3:1 | 1:4 to 2:1 | 1:3 to 1:1 | 1:2 |

*ultra-sonicated lecithin vesicles

Vesicle Dedusting Agent

The vesicle dedusting agents used in the present invention comprises vesicles. The vesicles may be liposomes or polymersomes. A liposome is a supramolecular assembly of lipid molecules that has a lipid bilayer structure that encapsulates fluid as illustrated below. Lipid vesicles or liposomes, consist of amphiphilic molecules called phospholipids with a hydrophilic, polar head group and hydrophobic, hydrocarbon tails. In aqueous solution, phospholipids (e.g. phosphatidylcholine (PC) and phosphatidylethanolamine) organize into vesicles with a bilayer shell. A polymersome similarly is a supramolecular assembly of polymer that has a polymer shell that encloses a solution. Polymeric vesicles, or polymersomes, are colloidal capsules with an aqueous core surrounded by a polymeric shell. Amphiphilic block copolymers, such as those composed of a hydrophilic block (e.g., poly(ethylene oxide) (PEO)) and a hydrophobic block (e.g. poly(ε-caprolactone) (PCL) or polylactide (PLA)), spontaneously self-assemble into colloidal structures in aqueous solution. For the present vesicles the outer and inner fluids are aqueous.

In preparing the joint compound formulation, the vesicles are first synthesized by known methods including film rehydration, extrusion, solvent displacement, ultrasonication, high pressure homogenization, high shear mixing, supercritical fluid processing, and detergent dialysis. A preferred method, for example, includes dispersing lecithin in an organic solvent, then evaporating the organic solvent to leave the lipid film. The lipid film is then rehydrated in water and formed into vesicles via ultrasonication, membrane extrusion, and/or homogenization.

After forming vesicles, the material can be dried to a powder (e.g., via lyophilization or spray drying) and mixed either with the dry components of the joint compound formulation or a joint compound slurry. Alternatively, the vesicle dedusting agent dispersed in an aqueous solvent (either after formation or redispersed after drying) can be added to the joint compound slurry. It is preferable to use lyophilized vesicles for setting-type joint compound (dry products) and aqueous colloidal dispersions for drying-type (wet state) joint compounds. Preferably, when preparing a drying-type joint compound, the vesicle dedusting agent is dispersed as an aqueous suspension. When using a vesicle dedusting agent in aqueous dispersion, the storage and handling conditions of the vesicle dedusting agent should be maintained to mitigate degradation or spoilage of a phospholipid and/or polymer component of the vesicles. Degradation or spoilage can be caused by temperature, humidity, bacteria, and mold.

Vesicles may have one bilayer wall (unilamellar) (e.g., as illustrated in FIG. 1) or may have multiple, concentric bilayer walls (multilamellar). A mixture of unilamellar and multilamellar vesicles is also suitable for use in the vesicle dedusting agents of the present invention.

The average hydrodynamic diameter (or mean hydrodynamic diameter) of unilamellar vesicles can be about 50 nm up to 5000 nm, preferably about 50 nm up to 1000 nm, more preferably about 50 nm up to 500 nm, and most preferably about 100 nm to about 300 nm. Preferably, the unilamellar vesicles also have a low polydispersity index (PDI). While the PDI of the vesicles may be about 0.2 to about 0.7, it is preferable to have a PDI of about 0.2 to about 0.5, and more preferably about 0.2 to about 0.4.

The average hydrodynamic diameter of multilamellar vesicles can be about 100 nm up to 25 microns, and preferably about 100 nm to about 5 microns, and more preferably about 100 nm to about 1 micron. Preferably, the multilamellar vesicles also have a low PDI. While the PDI of the vesicles may be about 0.2 to about 0.7, it is preferable to have a PDI of about 0.2 to about 0.5, and more preferably about 0.2 to about 0.4.

Average hydrodynamic diameter and PDI for unilamellar and multilamellar vesicle can be determined from a particle size distribution plot obtained via dynamic light scattering (DLS). DLS is a method to characterize the size and concentration of colloidal dispersions. The Stokes-Einstein Equation relates the hydrodynamic radius of a colloidal particle (assuming a hard sphere) with its diffusivity in a given solvent with known viscosity. In DLS a coherent laser light source is directed perpendicular to the sample. The light scattering of colloidal particles is detected by an autocorrelator computer to construct a correlation function, from which a correlation coefficient is extracted. From this autocorrelation function, the diffusivity, and hence the hydrodynamic radius, of colloidal particles can be measured.

The light scattering from DLS is not weight- or number-based. It is proportional to the sixth power of the radius. In other words, particles that are ten times bigger will scatter one million times more light. In peer-reviewed publications, average hydrodynamic diameter extracted from raw DLS data is reflective of this, unless otherwise noted as volume ($10^3$), surface area ($10^2$), or number ($10^1$).

Compounds suitable for forming vesicles (described below) have been used as dedusting agents in a free form (i.e., predominantly individual solubilized compounds).

The bilayers of the liposome vesicles in the joint compound formulation can comprise phospholipids (natural or synthetic), functionalized phospholipids, or mixtures thereof. Exemplary phospholipids include: lecithin (phosphatidylcholine), phosphatidylserine, phosphatidylinositol, phosphatidylethanolamine (PE), and mixtures thereof. Functionalized phospholipids include the foregoing phospholipids conjugated with polyethylene glycol (PEG) or polyethylene oxide (PEO), fluorescent or chromogenic dyes, proteins, peptides, carbohydrates (e.g., cellulose, starch, modified cellulose, modified starch), or synthetic polymers. Where a PEG or PEO phospholipid derivative is utilized, the weight percentage on a dry basis of the PEG or PEO is about 0.1 mol % to 10 mol % relative to the total vesicle composition. Preferably, the invention incorporates a PEGylated phospholipid (e.g., natural phospholipids (e.g. soy or egg yolk lecithin) and/or synthetic phospholipids) and/or methoxypoly(ethylene glycol)-phosphatidylethanolamine (mPEG-PE) into a joint compound formulation to provide the necessary dedusting effect. A dedusting effect is the reduction in the generation of fine airborne dust produced upon sanding or other disturbance compared to disturbing a similar material without the dedusting additive. More preferably, the invention includes a polymeric vesicle (e.g., PEO-b-PCL (Poly(ethylene oxide)-b-poly(ε-caprolactone)) or PEO-b-PLA (Poly(ethylene oxide-b-lactide)) incorporated into the joint compound formulation.

Alternatively, the joint compound formulation incorporates other vesicles which may not contain lecithin, PEG, PEO, or their derivatives. In this case, the dedusting effect is derived from the physical properties of the described vesicles without lecithin, PEO, PEG, or their derivatives dispersed in the joint compound product. It is conceivable that any vesicle containing a material with a melting temperature near room temperature will exhibit a phase change capable of acting as an agglomerating agent.

The polymer shell of polymersomes can comprise amphiphilic polymers, proteins, carbohydrates, lipids, and dendrimers. Amphiphilic polymers include diblock and triblock polymers comprising at least one hydrophilic block and at least one hydrophobic block. Exemplary hydrophilic blocks include: PEG, PEO, and PE. Typically, the PEG or PEO is less than 5000 Daltons. Exemplary hydrophobic blocks include PCL or PLA. Specific block copolymers include: PEO-b-PCL, PEO-b-PLA, and PEG-PE.

In some instances, the vesicles may include both lipids suitable for forming liposomes and block copolymers suitable for forming polymersomes. For example, in such vesicles the amount of block copolymer is typically 0 to about 70 mol % and the amount of lipid is about 30 to 100 mol %. For example, the amount of block copolymer in the vesicle wherein one block is PEG and the other block is a natural phospholipid, is typically 0 to about 20 mol % and the amount of lipid is about 80 to 100 mol %. For example, if mPEG-PE is included, the concentration of mPEG-PE typically ranges from 0-20 mol % in the phospholipid vesicles and the amount of lipid is about 80 to 100 mol %. Preferably, if mPEG-PE is included, the concentration of mPEG-PE ranges from 3-10 mol % in the phospholipid vesicles and the amount of lipid is about 90 to 97 mol %.

Calcium Sulfate Hemihydrate

Setting-type joint compounds and ready-mixed, setting-type joint compounds include calcium sulfate hemihydrate. There are two principal forms used, the alpha and beta crystalline forms. In general, the alpha form is the more expensive of the two and produces a stronger product. The beta form is adequate for many uses and, being less expensive, is more commonly used. For joint compounds of the invention, either type of the hemihydrate may be used including mixtures, but the alpha form is preferred.

For setting-type joint compounds and ready-mixed, setting-type joint compounds, the calcium sulfate hemihydrate can be included at about 20 wt % to about 99 wt % on a dry basis of the joint compound, preferably about 50 wt % to about 98 wt % on a dry basis, more preferably about 60 wt % to about 80 wt % on a dry basis and most preferably about 65 wt % to about 75 wt % on a dry basis.

Fillers

Filler compositions and concentrations are different for the different types of joint compounds and are distinguished herein with DT for drying-type and ST for setting-type. The ST fillers can be used in the setting-type joint compounds or the ready-mixed, setting-type joint compounds.

Drying-type joint compounds include a primary DT filler and optionally a secondary DT filler. Examples of primary DT fillers include: calcium carbonate (or limestone), calcium sulfate dihydrate, talc, and mixtures thereof.

For drying-type joint compounds, the primary DT filler can be included at about 50 wt % to about 98 wt % on a dry basis of the joint compound, and preferably about 50 wt % to about 93 wt % on a dry basis. For example, calcium carbonate as the primary DT filler can preferably be included in a drying-type joint compound at about 65 wt % to about 93 wt % on a dry basis. In another example, calcium sulfate dihydrate as the primary DT filler can preferably be included in a drying-type joint compound at about 50 wt % to about 93 wt % on a dry basis, and more preferably at about 55 wt % to about 75 wt % on a dry basis.

Examples of secondary DT fillers include, but are not limited to, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. Secondary DT fillers may be useful as fillers and also used to impart specific properties to the joint compounds. For example, mica aids in reduced cracking of the joint compound as it dries, and is preferred in amounts of up to 25 wt % on a dry basis. It is also preferred to add clay in amounts of up to about 10 wt % on a dry basis to improve the body and workability of the joint compound, and as a rheology modifier.

For drying-type joint compounds, the secondary DT filler can be included at up to about 25 wt % on a dry basis of the joint compound, preferably about 3 wt % to about 25 wt % on a dry basis, and more preferably about 4 wt % to about 25 wt % on a dry basis.

Setting-type joint compounds and ready-mixed, setting-type joint compounds optionally include a ST filler. Examples of ST fillers include, but are not limited to, calcium carbonate, calcium sulfate dihydrate, talc, glass micro bubbles, mica, perlite, pyrophyllite, silica, calcium sulfate anhydrite, diatomaceous earth, clay (e.g., attapulgite, sepiolite and kaolin), resin microspheres, and mixtures thereof. ST fillers may be useful as fillers and also used to impart specific properties to the joint compounds. For example, clay in amounts of up to about 10 wt % on a dry basis can be used to improve the body and workability of the joint compound, and as a rheology modifier. In another example, calcium carbonate can be included at about 10 wt % to about 20 wt % on a dry basis to add bulk to the joint compound.

For setting-type joint compounds and ready-mixed, setting-type joint compounds, the ST filler, when include, can be at about 1 wt % to about 30 wt % on a dry basis of the joint compound, preferably about 5 wt % to about 30 wt % on a dry basis, and more preferably about 5 wt % to about 25 wt % on a dry basis.

Perlite or expanded perlite is a lightweight filler that may be used where the joint compound (or drying-type, setting-type, ready-mixed, and/or setting-type) is preferably lightweight. Use of expanded perlite in a lightweight joint compound is taught in U.S. Pat. No. 4,454,267, which is herein incorporated by reference. Expanded perlite is a very lightweight material that contains many cracks and fissures. It can be treated according to the teachings of U.S. Pat. No. 4,525,388, which is hereby incorporated by reference, so that the material does not increase in weight due to water absorbed by capillary action. The treated, expanded perlite, when used, is preferably present in concentrations of at least 5 wt % on a dry basis of the joint compound.

Any joint compound of the present invention optionally includes resin microspheres as a filler to be used in place of or in addition to expanded perlite in lightweight formulations. Preferred shell resins suitable for use in the present invention are homopolymers, copolymers, or blends of homopolymers and/or copolymers formed one or more of acrylonitrile ("ACN"), vinylidene chloride ("VDC"), or methyl methacrylate ("MMA") monomers. Particularly preferred resins are polyacrylonitrile ("PACN"), polyvinylidene chloride ("PVDC"), copolymers formed from ACN and VDC, and copolymers found from ACN, VDC, and MMA. The microspheres demonstrate high resiliency to compression without collapse (non-friable) and are able to withstand the exerted shear stress (shear-stability) of a typical joint treatment manufacturing process and subsequent customer preparation.

Binders

Any binder that is suitable for use in a joint compound is appropriate for use in the present invention. The binder can enhance the adhesion of the joint compound to its substrate, typically drywall. Preferred binders are soft and pliable rather than being extremely hard. Hard binders are likely to create more fine dust particles compared to pliable polymers.

Examples of binders include, but are not limited to, polyvinyl acetate, polyvinyl alcohol, ethylene vinyl acetate co-polymer, vinyl chlorides, vinyl acrylic co-polymer, styrene acrylics, styrene butadiene, polyacrylamide, polyvinylacrylic, latex emulsions, natural and synthetic starch, casein, and mixtures thereof.

For drying-type joint compounds, binders can be included at about 1 wt % to about 15 wt % on a dry basis of the joint compound, preferably about 1 wt % to about 10 wt % on a dry basis, and most preferably about 1 wt % to about 8 wt % on a dry basis.

For setting-type joint compounds, binders can be included at about 0.5 wt % to about 8 wt % on a dry basis of the joint compound, preferably about 1 wt % to about 8 wt % on a dry basis, and most preferably about 1 wt % to about 4 wt % on a dry basis.

For ready-mixed, setting-type joint compounds, binders, when included, can be at about 0.1 wt % to about 8 wt % on a dry basis of the joint compound, preferably 0.5 wt % to about 6 wt % on a dry basis, and most preferably about 1 wt % to about 4 wt % on a dry basis.

For example, latex emulsion binders are often used in joint compounds (drying-type and/or setting-type) and may be included in joint compounds of the invention. Examples include polyvinyl acetate and ethylene vinyl acetate emulsions. The amount used may range from about 1.5 wt % to about 7 wt % on a dry basis of the joint compound, preferably about 2 wt % to about 5.5 wt % on a dry basis.

The weight ratio of total fillers to total binders is preferably in the range of from about 15:1 to about 5:1.

Polymer Thickeners

Polymer thickeners are added to the joint compound of the present invention. After water is added to the composition, the thickener becomes hydrated and swells, thereby thickening the joint compound. Thickeners are useful, for example, in helping to create the body and flow properties commonly associated with joint compounds. Preferably, the thickener is selected so that it substantially hydrates during the mixing process after water is added to the composition, with little or no hydration of the thickener occurring after mixing is completed, to prevent formation of lumps in the joint compound.

Examples of polymer thickeners include, but are not limited to, ethylhydroxy ethylcellulose, hydroxypropyl methylcellulose, methylhydroxypropyl cellulose, hydroxyethyl cellulose, cellulose-based gums (e.g., xanthan gum, gum Arabic, alginate, pectin, and guar gums), and mixtures thereof.

For drying-type joint compounds, polymer thickeners can be included at about 0.05 wt % to about 3 wt % on a dry basis of the joint compound, preferably about 0.1 wt % to about 3 wt % on a dry basis, more preferably about 0.1 wt % to about 2 wt % on a dry basis, and most preferably about 0.5 wt % to about 2 wt % on a dry basis.

For setting-type joint compounds, polymer thickeners can be included at about 0.05 wt % to about 2 wt % on a dry basis of the joint compound, preferably about 0.1 wt % to about 2 wt % on a dry basis, and most preferably about 0.1 wt % to about 1 wt % on a dry basis.

For ready-mixed, setting-type joint compounds, polymer thickeners, when included, can be at 0.01 wt % to about 2 wt % on a dry basis of the joint compound, preferably about 0.1 wt % to about 2 wt % on a dry basis, and most preferably about 0.1 wt % to about 1 wt % on a dry basis.

Set Retarders

Set retarders are included in ready-mixed, setting-type joint compounds. Set retarders are optionally included in drying-type joint compounds and setting-type joint compounds and are considered one of the other additives in Tables 1 and 2.

Set retarders (or set inhibitors or set preventer) slow the setting and/or drying of the joint compounds to provide ample time to properly apply the joint compound.

Examples of set retarders include, but are not limited to, polymer compositions including acrylic acid and acrylamide monomer units (e.g., a copolymer (or a mixture of copolymers) of acrylic acid and acrylamide or a blend of a homopolymer of acrylic acid and a homopolymer of acrylamide), as described in U.S. Pat. No. 5,779,786, incorporated herein by reference.

Additional examples of non-calcium bearing phosphate set retarders include, but are not limited to, zinc hexametaphosphate, potassium tripolyphosphate, tetra sodium pyrophosphate, sodium tripolyphosphate, monoammonium phosphate, and monobasic potassium phosphate, as described in U.S. Pat. No. 5,746,822, incorporated herein by reference.

Examples of set retarders include, but are not limited to, polymer compositions including polyacrylic acid and/or a salt of polyacrylic acid, as described in U.S. Pat. No. 6,805,741, incorporated herein by reference.

For ready-mixed, setting-type joint compounds, set retarders can be included at about 0.001 wt % to about 2 wt % on a dry basis of the joint compound, preferably about 0.01 wt % to about 2 wt % on a dry basis, more preferably about 0.1 wt % to about 1 wt % on a dry basis, and most preferably about 0.25 wt % to about 0.75 wt % on a dry basis.

For drying-type joint compounds and setting-type joint compounds, set retarders, when included, can be at about 0.001 wt % to about 2 wt % on a dry basis of the joint compound, preferably about 0.01 wt % to about 2 wt % on a dry basis, more preferably about 0.1 wt % to about 1 wt % on a dry basis, and most preferably about 0.25 wt % to about 0.75 wt % on a dry basis.

Set Accelerators

Set accelerators added to ready-mixed, setting-type joint compounds at the time of use. Set accelerators are optionally included in drying-type joint compounds and setting-type joint compounds and are considered one of the other additives in Tables 1 and 2.

Set accelerators (or set initiators or activators) accelerator and/or initiate setting and/or drying of the joint compounds.

Examples of set initiators include, but are not limited to, metallic salts that provide acidic cations, such as aluminum sulfate, potassium sulfate, calcium sulfate, ferric sulfate, ferric chloride, and mixtures thereof, as described in U.S. Pat. No. 5,779,786, incorporated herein by reference. Another example of set initiators include, but are not limited to, zinc sulfate optionally in combination with iron oxide (e.g., in a weight ratio of 19:1).

Additional examples of set initiators include, but are not limited to, zinc sulfate, aluminum sulfate, sulfuric acid, hydrochloric acid, sodium hydrogen sulfate, potassium hydrogen sulfate, potassium aluminum sulfate, calcium sulfate dihydrate, and mixtures thereof, as described in U.S. Pat. No. 6,805,741, incorporated herein by reference.

Set initiators can optionally also include amine chelating agents.

Set initiators can be added to ready-mixed, setting-type joint compounds at a weight ratio to set retarders of about 1.2:1 to about 6:1, and preferably about 2:1 to about 6:1.

When used, set initiators can be included in or added drying-type joint compounds and setting-type joint compounds at a weight ratio to set retarders of about 1.2:1 to about 6:1, and preferably about 2:1 to about 6:1.

Other Additives

Other additives that can optionally be included in joint compounds include, but are not limited to, preservatives, fungicides, bactericides, defoaming agents, glycols, humectants, and mixtures thereof.

For drying-type joint compounds, when included, other additives (in total) can be included at about 0.01 wt % to about 10 wt % on a dry basis of the joint compound, and preferably about 0.1 wt % to about 10 wt % on a dry basis.

For setting-type joint compounds and ready-mixed, setting-type joint compounds, when included, other additives (in total) can be included at about 0.01 wt % to about 10 wt % on a dry basis of the joint compound, preferably about 0.01 wt % to about 5 wt % on a dry basis, and most preferably about 0.1 wt % to about 1.0 wt % on a dry basis.

Defoamers reduce or hinder the formation of air bubbles, which may form especially when mixing. Examples of defoamers include, but are not limited to, hydrocarbon-based, silicon-based defoamer, and mixtures thereof.

A glycol can be used in a joint compound to provide functional properties to the joint compound such as wet edge, open time, controlling drying time, and freeze/thaw stability. Examples of glycols include, but are not limited to, diethyl glycol, ethylene glycol, propylene glycol, and mixtures thereof. When included, the amount of glycol used in a joint compound of the invention is preferably in a range of about 0.1 wt % to about 1 wt % on a dry basis of the joint compound.

Clauses Describing Various Characteristics of Products of the Invention

Clause 1. A drying-type joint compound can comprise: (a) a primary filler at about 50 weight percent (wt %) to about 98 wt % of the drying-type joint compound on a dry basis, wherein the primary filler comprises one selected from the group consisting of calcium carbonate, calcium sulfate dihydrate, and talc, and a mixture thereof; (b) a secondary filler at up to about 25 wt % of the drying-type joint compound on a dry basis; (c) a binder at about 1 wt % to about 15 wt % of the drying-type joint compound on a dry basis; (d) a polymer thickener at about 0.05 wt % to about 3 wt % of the drying-type joint compound on a dry basis; (e) a vesicle dedusting agent at about 0.01 wt % to about 10 wt % of the drying-type joint compound on a dry basis, wherein the vesicle dedusting agent comprises vesicles; and (f) an additive up to about 10 wt % of the drying-type joint compound on a dry basis; and (g) water at a ratio of water to dry components of about 1:6 to about 3:1.

Clause 2. The joint compound of Clause 1, wherein the vesicles comprise unilamellar vesicles.

Clause 3. The joint compound of Clause 2, wherein the unilamellar vesicles have an average hydrodynamic diameter of about 50 nm up to 500 nm and a polydispersity index of about 0.2 to about 0.5.

Clause 4. The joint compound of any of Clauses 1-3, wherein the vesicles comprise multilamellar vesicles.

Clause 5. The joint compound of Clause 4, wherein the multilamellar vesicles have an average hydrodynamic diameter of about 100 nm up to 5 microns and a polydispersity index of about 0.2 to about 0.5.

Clause 6. The joint compound of any one of Clauses 1-5, wherein the vesicles comprise lecithin.

Clause 7. The joint compound of any one of Clauses 1-6, wherein the vesicles comprise a polyethylene glycol phospholipid derivative and methoxypoly(ethylene glycol)-phosphatidylethanolamine (mPEG-PE).

Clause 8. The joint compound of Clause 7, wherein a weight percentage on a dry basis of the PEG in the polyethylene glycol phospholipid derivative and the mPEG-PE is cumulatively about 0.1 mol % to about 10 mol % based on a total vesicle composition.

Clause 9. The joint compound of any one of Clauses 1-8, wherein the vesicles comprise polyethylene oxide-block-poly(ε-caprolactone) and/or polyethylene oxide-block-polylactide.

Clause 10. The joint compound of any one of Clauses 1-9 comprising: (a) the primary filler at about 65 wt % to about 93 wt % of the drying-type joint compound on a dry basis, wherein the primary filler is calcium carbonate; (b) the secondary filler about 3 wt % to about 25 wt % of the drying-type joint compound on a dry basis; (c) the binder at about 1 wt % to about 10 wt % of the drying-type joint compound on a dry basis; (d) the polymer thickener at about 0.1 wt % to about 2 wt % of the drying-type joint compound on a dry basis; (e) the vesicle dedusting agent at about 0.1 wt % to about 3 wt % of the drying-type joint compound on a dry basis; (f) the additive about 0.01 wt % to about 10 wt % of the drying-type joint compound on a dry basis; and (g) the water at the ratio of water to dry components of about 1:3 to about 1:1.

Clause 11. The joint compound of any one of Clauses 1-10 comprising: (a) the primary filler at about 50 wt % to about 93 wt % of the drying-type joint compound on a dry basis, wherein the primary filler is calcium sulfate dihydrate; (b) the secondary filler about 3 wt % to about 25 wt % of the drying-type joint compound on a dry basis; (c) the binder at about 1 wt % to about 10 wt % of the drying-type joint compound on a dry basis; (d) the polymer thickener at about 0.1 wt % to about 2 wt % of the drying-type joint compound on a dry basis; (e) the vesicle dedusting agent at about 0.1 wt % to about 3 wt % of the drying-type joint compound on a dry basis; and (f) the additive about 0.01 wt % to about 10 wt % of the drying-type joint compound on a dry basis; and (g) the water at the ratio of water to dry components of about 1:3 to about 1:1.

Clause 12. A setting-type joint compound comprising: (a) a calcium sulfate hemihydrate at about 20 weight percent (wt %) to about 99 wt % of the setting-type joint compound on a dry basis; (b) a filler at up to about 30 wt % of the setting-type joint compound on a dry basis; (c) a binder at about 0.5 wt % to about 8 wt % of the setting-type joint compound on a dry basis; (d) a polymer thickener at about 0.05 wt % to about 2 wt % of the setting-type joint compound on a dry basis; (e) a vesicle dedusting agent at about 0.01 wt % to about 10 wt % of the setting-type joint compound on a dry basis, wherein the vesicle dedusting agent comprises vesicles; and (f) an additive up to about 10 wt % of the setting-type joint compound on a dry basis.

Clause 13. The joint compound of Clause 12, wherein the vesicles comprise unilamellar vesicles.

Clause 14. The joint compound of Clause 13, wherein the unilamellar vesicles have an average hydrodynamic diameter of about 50 nm up to 500 nm and a polydispersity index of about 0.2 to about 0.5.

Clause 15. The joint compound of any one of Clauses 12-14, wherein the vesicles comprise multilamellar vesicles.

Clause 16. The joint compound of composition 15, wherein the multilamellar vesicles have an average hydrodynamic diameter of about 100 nm up to 5 microns and a polydispersity index of about 0.2 to about 0.5.

Clause 17. The joint compound of any one of Clauses 12-16, wherein the vesicles comprise lecithin.

Clause 18. The joint compound of any one of Clauses 12-17, wherein the vesicles comprise a polyethylene glycol phospholipid derivative and methoxypoly(ethylene glycol)-phosphatidylethanolamine (mPEG-PE).

Clause 19. The joint compound of Clause 18, wherein a weight percentage on a dry basis of the PEG in the polyethylene glycol phospholipid derivative and the mPEG-PE is cumulatively about 0.1 mol % to about 10 mol % based on a total vesicle composition.

Clause 20. The joint compound of any one of Clauses 12-19, wherein the vesicles comprise polyethylene oxide-block-poly(ε-caprolactone) and/or polyethylene oxide-block-polylactide.

Clause 21. The joint compound of any one of Clauses 12-20, comprising: (a) the calcium sulfate hemihydrate at about 60 wt % to about 85 wt % of the setting-type joint compound on a dry basis; (b) the secondary filler about 5 wt % to about 30 wt % of the setting-type joint compound on a dry basis; (c) the binder at about 1 wt % to about 4 wt % of the setting-type joint compound on a dry basis; (d) the polymer thickener at about 0.1 wt % to about 1 wt % of the setting-type joint compound on a dry basis; (e) the vesicle dedusting agent at about 0.1 wt % to about 3 wt % of the setting-type joint compound on a dry basis; and (f) the additive about 0.1 wt % to about 5 wt % of the setting-type joint compound on a dry basis.

Clause 22. A ready-mixed, setting-type joint compound comprising: (a) a calcium sulfate hemihydrate at about 20 weight percent (wt %) to about 99 wt % of the ready-mixed, setting-type joint compound on a dry basis; (b) a filler at up to about 30 wt % of the ready-mixed, setting-type joint compound on a dry basis; (c) a set retarder at about 0.001 wt % to about 2 wt % of the ready-mixed, setting-type joint compound on a dry basis; (d) a binder at up to about 8 wt % of the ready-mixed, setting-type joint compound on a dry basis; (e) a polymer thickener at up to about 2 wt % of the ready-mixed, setting-type joint compound on a dry basis; (f) a vesicle dedusting agent at about 0.01 wt % to about 10 wt % of the ready-mixed, setting-type joint compound on a dry basis, wherein the vesicle dedusting agent comprises vesicles; (g) an additive up to about 10 wt % of the ready-mixed, setting-type joint compound on a dry basis; and (h) water at a ratio of water to dry components of about 1:6 to about 3:1.

Clause 23. The joint compound of Clause 22, wherein the vesicles comprise unilamellar vesicles.

Clause 24. The joint compound of Clause 23, wherein the unilamellar vesicles have an average hydrodynamic diameter of about 50 nm up to 500 nm and a polydispersity index of about 0.2 to about 0.5.

Clause 25. The joint compound of any one of Clauses 22-24, wherein the vesicles comprise multilamellar vesicles.

Clause 26. The joint compound of Clause 25, wherein the multilamellar vesicles have an average hydrodynamic diameter of about 100 nm up to 5 microns and a polydispersity index of about 0.2 to about 0.5.

Clause 27. The joint compound of any one of Clauses 22-26, wherein the vesicles comprise lecithin.

Clause 28. The joint compound of any one of Clauses 22-27, wherein the vesicles comprise a polyethylene glycol phospholipid derivative and methoxypoly(ethylene glycol)-phosphatidylethanolamine (mPEG-PE).

Clause 29. The joint compound of Clause 28, wherein a weight percentage on a dry basis of the PEG in the polyethylene glycol phospholipid derivative and the mPEG-PE is cumulatively about 0.1 mol % to about 10 mol % based on a total vesicle composition.

Clause 30. The joint compound of any one of Clauses 22-29, wherein the vesicles comprise polyethylene oxide-block-poly(ε-caprolactone) and/or polyethylene oxide-block-polylactide.

Clause 31. The joint compound of any one of Clauses 22-31, comprising: (a) the calcium sulfate hemihydrate at about 60 wt % to about 99 wt % of the ready-mixed, setting-type joint compound on a dry basis; (b) the filler at about 5 wt % to about 30 wt % of the ready-mixed, setting-type joint compound on a dry basis; (c) the set retarder at about 0.1 wt % to about 1 wt % of the ready-mixed, setting-type joint compound on a dry basis; (d) the binder at up to about 4 wt % of the ready-mixed, setting-type joint compound on a dry basis; (e) the polymer thickener at about 0.1 wt % to about 2 wt % of the ready-mixed, setting-type joint compound on a dry basis; (f) the vesicle dedusting agent at about 0.1 wt % to about 3 wt % of the ready-mixed, setting-type joint compound on a dry basis, wherein the vesicle dedusting agent comprises vesicles; (g) the additive about 0.1 wt % to about 10 wt % of the ready-mixed, setting-type joint compound on a dry basis; and (h) the water at the ratio of water to dry components of about 1:3 to about 1:1.

EXAMPLES

In the examples herein, as mentioned above, percentages of compositions or product formulae are in weight percentages, unless otherwise expressly stated. The reported measurements also in approximate amounts unless expressly stated, for example, approximate percentages, weights, temperatures, distances or other properties.

Example 1

A vesicle dedusting agent comprising lecithin vesicles was prepared by a film rehydration and ultrasonication method. Briefly, lecithin powder was dissolved in chloroform (other suitable organic solvents could have been used). The chloroform was evaporated away using Argon gas to form a lipid film. The lipid film was rehydrated with water, and the mixture was ultrasonicated in a sonicator bath for one hour or more to form a turbid, milky dispersion, consistent with mixtures containing unilamellar vesicles.

Alternatively, high shear mixing can also be used. In short, lecithin powder was added to water and the mixture was homogenized at high shear (e.g., about 10,000 rpm or greater in a Cowles-type mixer) for 30 minutes or more. The vesicle dispersion could be subsequently sonicated after mixing to result in smaller diameter unilamellar vesicles.

Example 2

Joint compounds were produced according to Table 4 where the dedusting agent in Formula 1 was lecithin without additional processing (i.e., free lecithin) and the dedusting agent in Formula 2 was lecithin vesicles. The Control had no lecithin. Except for the ratio of water to dry components, all amounts of components of Table 4 are on a dry (water free) weight percent basis.

TABLE 4

Example formulations

| Component | Control | Formula 1 | Formula 2 |
|---|---|---|---|
| Calcium carbonate (wt % on a dry basis) | 92.8 | 89.8 | 89.8 |
| Lecithin (wt % on a dry basis) | 0 | 0.5* | 0.5** |
| Water swelling clays (wt % on a dry basis) | 3.5 | 3.5 | 3.5 |
| Latex emulsion binder (wt % on a dry basis) | 2.3 | 4.6 | 4.6 |
| PVA binder (wt % on a dry basis) | 0 | 0.2 | 0.2 |
| Cellulosic thickeners (wt % on a dry basis) | 1.1 | 1.1 | 1.1 |
| Other additives*** (wt % on a dry basis) | 0.3 | 0.3 | 0.3 |
| Water (weight ratio of water to dry components) | 0.75:1 | 0.75:1 | 0.75:1 |

*free lecithin
**vesical lecithin prepared per Example 1
***including biocide

A modified version of the ASTM C474-15 tape bond test method at 75° F. and 50% relative humidity was carried out to measure the % tape fiber remaining, an indication of joint strength and a key performance property of joint compound. A lightweight joint compound formula containing 0.5% 'free' lecithin was modified with additional binders ("Formula 1"). Another lightweight joint compound formula containing 0.5 wt % lecithin vesicles was modified with the same additional binders ("Formula 2) as Formula 1. A third, unmodified lightweight joint compound without additional binders or lecithin ("Control") was used for comparison. Table 5 provides the paper tape bond test results over three trials for the different formulations.

TABLE 5

Example formulations

| | Control | Formula 1* | Formula 2** |
|---|---|---|---|
| Trial 1 | 95 | 20 | 65 |
| Trial 2 | 95 | 10 | 65 |
| Trial 3 | 95 | 35 | 80 |
| Average | 95 | 22 | 70 |

*lecithin dedusting agent
**lecithin vesicle dedusting agent

The results in Table 5 indicate the joint compound containing 'free' lecithin (Formula 1) has considerably less joint strength than joint compound containing lecithin vesicles (Formula 2). In other words, lecithin vesicles do not diminish joint strength as significantly as 'free' lecithin compared to control.

Figure 4:
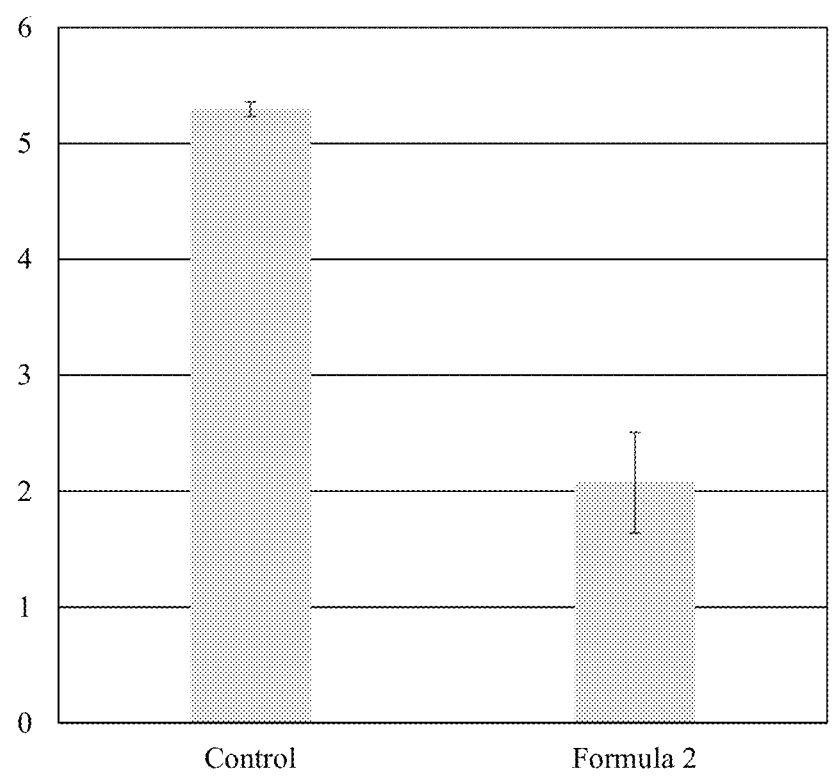
FIG. 4 is a plot of the average dust concentration (mg/m$^3$) produced from the example Control and Formula 2.

Additionally, the Control and Formula 2 were tested for the amount of dust produced when sanded for 40 seconds in an enclosed room with consistent force. The average dust was measured using a dust tracking device for 15 minutes. FIG. 4 is a plot of the average dust concentration (mg/m$^3$) produced from each sample.

While particular versions of the invention have been shown and described, it will be appreciated by those skilled in the art that changes and modifications may be made thereto without departing from the invention in its broader aspects and as set forth in the following claims.

What is claimed is:

1. A joint compound selected from the group consisting of a drying-type joint compound, a setting-type joint compound, and a ready-mixed, setting-type joint compound,
   wherein the drying-type joint compound comprises:
      a primary filler at about 50 weight percent (wt %) to about 98 wt % of the drying-type joint compound on a dry basis, wherein the primary filler comprises one selected from the group consisting of calcium carbonate, calcium sulfate dihydrate, and talc, and a mixture thereof;
      a secondary filler at up to about 25 wt % of the drying-type joint compound on a dry basis;
      a binder at about 1 wt % to about 15 wt % of the drying-type joint compound on a dry basis;
      a polymer thickener at about 0.05 wt % to about 3 wt % of the drying-type joint compound on a dry basis;
      a vesicle dedusting agent at about 0.01 wt % to about 10 wt % of the drying-type joint compound on a dry basis, wherein the vesicle dedusting agent comprises vesicles;
      an additive up to about 10 wt % of the drying-type joint compound on a dry basis; and
      water at a ratio of water to dry components of about 1:6 to about 3:1;
   wherein the setting-type joint compound comprises:
      a calcium sulfate hemihydrate at about 20 weight percent (wt %) to about 99 wt % of the setting-type joint compound on a dry basis;
      a filler at up to about 30 wt % of the setting-type joint compound on a dry basis;
      a binder at about 0.5 wt % to about 8 wt % of the setting-type joint compound on a dry basis;
      a polymer thickener at about 0.05 wt % to about 2 wt % of the setting-type joint compound on a dry basis;

a vesicle dedusting agent at about 0.01 wt % to about 10 wt % of the setting-type joint compound on a dry basis, wherein the vesicle dedusting agent comprises vesicles; and
an additive up to about 10 wt % of the setting-type joint compound on a dry basis; and
wherein the ready-mixed, setting-type joint compound comprises:
a calcium sulfate hemihydrate at about 20 weight percent (wt %) to about 99 wt % of the ready-mixed, setting-type joint compound on a dry basis;
a filler at up to about 30 wt % of the ready-mixed, setting-type joint compound on a dry basis;
a set retarder at about 0.001 wt % to about 2 wt % of the ready-mixed, setting-type joint compound on a dry basis
a binder at up to about 8 wt % of the ready-mixed, setting-type joint compound on a dry basis;
a polymer thickener at up to about 2 wt % of the ready-mixed, setting-type joint compound on a dry basis;
a vesicle dedusting agent at about 0.01 wt % to about 10 wt % of the ready-mixed, setting-type joint compound on a dry basis, wherein the vesicle dedusting agent comprises vesicles;
an additive up to about 10 wt % of the ready-mixed, setting-type joint compound on a dry basis; and
water at a ratio of water to dry components of about 1:6 to about 3:1.

2. The joint compound of claim 1, wherein the vesicles comprise unilamellar vesicles.

3. The joint compound of claim 2, wherein the unilamellar vesicles have an average hydrodynamic diameter of about 50 nm up to 5000 nm and a polydispersity index of about 0.2 to about 0.5.

4. The joint compound of claim 2, wherein the unilamellar vesicles have an average hydrodynamic diameter of about 50 nm up to 500 nm and a polydispersity index of about 0.2 to about 0.5.

5. The joint compound of claim 1, wherein the vesicles comprise multilamellar vesicles.

6. The joint compound of claim 5, wherein the multilamellar vesicles have an average hydrodynamic diameter of about 100 nm up to 5 microns and a polydispersity index of about 0.2 to about 0.5.

7. The joint compound of claim 1, wherein the vesicles comprise lecithin.

8. The joint compound of claim 1, wherein the vesicles comprise a polyethylene glycol phospholipid derivative and methoxypoly(ethylene glycol)-phosphatidylethanolamine (mPEG-PE).

9. The joint compound of claim 8, wherein a weight percentage on a dry basis of the PEG in the polyethylene glycol phospholipid derivative and the mPEG-PE is cumulatively about 0.1 mol % to about 10 mol % based on a total vesicle composition.

10. The joint compound of claim 1, wherein the vesicles comprise polyethylene oxide-block-poly(ε-caprolactone) and/or polyethylene oxide-block-polylactide.

11. The joint compound of claim 1, wherein the joint compound is the drying-type joint compound and comprises:
(a) the primary filler at about 65 wt % to about 93 wt % of the drying-type joint compound on a dry basis, wherein the primary filler is calcium carbonate;
(b) the secondary filler about 3 wt % to about 25 wt % of the drying-type joint compound on a dry basis;
(c) the binder at about 1 wt % to about 10 wt % of the drying-type joint compound on a dry basis;
(d) the polymer thickener at about 0.1 wt % to about 2 wt % of the drying-type joint compound on a dry basis;
(e) the vesicle dedusting agent at about 0.1 wt % to about 3 wt % of the drying-type joint compound on a dry basis;
(f) the additive about 0.01 wt % to about 10 wt % of the drying-type joint compound on a dry basis; and
(g) the water at the ratio of water to dry components of about 1:3 to about 1:1.

12. The joint compound of claim 1, wherein the joint compound is the drying-type joint compound and comprises:
(a) the primary filler at about 50 wt % to about 93 wt % of the drying-type joint compound on a dry basis, wherein the primary filler is calcium sulfate dihydrate;
(b) the secondary filler about 3 wt % to about 25 wt % of the drying-type joint compound on a dry basis;
(c) the binder at about 1 wt % to about 10 wt % of the drying-type joint compound on a dry basis;
(d) the polymer thickener at about 0.1 wt % to about 2 wt % of the drying-type joint compound on a dry basis;
(e) the vesicle dedusting agent at about 0.1 wt % to about 3 wt % of the drying-type joint compound on a dry basis; and
(f) the additive about 0.01 wt % to about 10 wt % of the drying-type joint compound on a dry basis; and
(g) the water at the ratio of water to dry components of about 1:3 to about 1:1.

13. The joint compound of claim 1, wherein the joint compound is the setting-type joint compound and comprises:
(a) the calcium sulfate hemihydrate at about 60 wt % to about 85 wt % of the setting-type joint compound on a dry basis;
(b) the secondary filler about 5 wt % to about 30 wt % of the setting-type joint compound on a dry basis;
(c) the binder at about 1 wt % to about 4 wt % of the setting-type joint compound on a dry basis;
(d) the polymer thickener at about 0.1 wt % to about 1 wt % of the setting-type joint compound on a dry basis;
(e) the vesicle dedusting agent at about 0.1 wt % to about 3 wt % of the setting-type joint compound on a dry basis; and
(f) the additive about 0.1 wt % to about 5 wt % of the setting-type joint compound on a dry basis.

14. The joint compound of claim 1, wherein the joint compound is the ready-mixed, setting-type joint compound and comprises:
(a) the calcium sulfate hemihydrate at about 60 wt % to about 99 wt % of the ready-mixed, setting-type joint compound on a dry basis;
(b) the filler at about 5 wt % to about 30 wt % of the ready-mixed, setting-type joint compound on a dry basis;
(c) the set retarder at about 0.1 wt % to about 1 wt % of the ready-mixed, setting-type joint compound on a dry basis
(d) the binder at up to about 4 wt % of the ready-mixed, setting-type joint compound on a dry basis;
(e) the polymer thickener at about 0.1 wt % to about 2 wt % of the ready-mixed, setting-type joint compound on a dry basis;
(f) the vesicle dedusting agent at about 0.1 wt % to about 3 wt % of the ready-mixed, setting-type joint compound on a dry basis, wherein the vesicle dedusting agent comprises vesicles;
(g) the additive about 0.1 wt % to about 10 wt % of the ready-mixed, setting-type joint compound on a dry basis; and
(h) the water at the ratio of water to dry components of about 1:3 to about 1:1.

* * * * *